(12) United States Patent
Marie et al.

(10) Patent No.: US 10,252,355 B2
(45) Date of Patent: Apr. 9, 2019

(54) CUTTING TOOL AND A CUTTING INSERT FOR CHIP-REMOVING TOOL

(71) Applicant: SANDVIK INTELECTUAL PROPERTY AB, Sandviken (SE)

(72) Inventors: Gilles Marie, Tours (FR); Marc Rue, Charentilly (FR); Jacques Gasthuys, Saint Jean de Braye (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 98 days.

(21) Appl. No.: 15/513,591

(22) PCT Filed: Sep. 3, 2015

(86) PCT No.: PCT/EP2015/070131
§ 371 (c)(1),
(2) Date: Mar. 23, 2017

(87) PCT Pub. No.: WO2016/045928
PCT Pub. Date: Mar. 31, 2016

(65) Prior Publication Data
US 2017/0291233 A1    Oct. 12, 2017

(30) Foreign Application Priority Data
Sep. 24, 2014    (EP) .................................... 14186207

(51) Int. Cl.
*B23C 5/20* (2006.01)
*B23C 5/22* (2006.01)
*B23C 5/06* (2006.01)

(52) U.S. Cl.
CPC .............. *B23C 5/2247* (2013.01); *B23C 5/06* (2013.01); *B23C 5/2221* (2013.01);
(Continued)

(58) Field of Classification Search
CPC ........ B23C 2200/045; B23C 2200/081; B23C 2200/161; B23C 2200/168;
(Continued)

(56) References Cited

U.S. PATENT DOCUMENTS 9,233,425 B2 *   1/2016   Sunnvius .................. B23C 5/06
2007/0183857 A1 *   8/2007   Wihlborg .................. B23C 5/06
                                                               407/67

(Continued)

FOREIGN PATENT DOCUMENTS

DE     102012004180 A1   10/2012
EP         1629917 B1    12/2012
(Continued)

*Primary Examiner* — Will Fridie, Jr.
(74) *Attorney, Agent, or Firm* — Corinne R. Gorski

(57) ABSTRACT

A cutting tool has a tool body having at least one pocket, at least one cutting insert releasably fixed to the pocket and a fastening device for securing the insert in the pocket. The pocket has a raised portion) with a flat upper support face arranged to be received in a recess of the insert and support the insert by receiving a bottom surface of the recess bearing on the support face. A projecting member of the raised portion has delimiting walls designed to bear against border walls of the recess of an insert for establishing mutual contact therewith and prevent rotation of the insert in the pocket by receiving a rotational moment acting on the insert in an active chip-removing state of the tool.

20 Claims, 2 Drawing Sheets

(52) U.S. Cl.
CPC .. *B23C 2200/045* (2013.01); *B23C 2200/165* (2013.01); *B23C 2200/168* (2013.01); *B23C 2210/163* (2013.01); *B23C 2210/168* (2013.01)

(58) Field of Classification Search
CPC .......... B23C 2200/167; B23C 2200/16; B23C 2200/165; B23C 2210/165; B23C 2210/163
See application file for complete search history.

(56) References Cited

U.S. PATENT DOCUMENTS

| | | | | | |
|---|---|---|---|---|---|
| 2008/0304928 | A1* | 12/2008 | Engstrom | ............. | B23C 5/2247 408/229 |
| 2010/0080662 | A1* | 4/2010 | Satran | ................... | B23C 5/2213 407/40 |
| 2011/0091294 | A1* | 4/2011 | Michelet | ................... | B23C 5/06 407/42 |
| 2011/0103905 | A1* | 5/2011 | Morrison | ............... | B23C 5/2213 407/48 |
| 2013/0279994 | A1 | 10/2013 | Morrison et al. | | |
| 2013/0330136 | A1* | 12/2013 | Hecht | ................... | B23C 5/2221 407/113 |
| 2014/0086694 | A1* | 3/2014 | Fang | ................... | B23C 5/2221 407/48 |
| 2014/0086696 | A1* | 3/2014 | Fang | ................... | B23C 5/2221 407/99 |
| 2014/0212226 | A1* | 7/2014 | Saji | ......................... | B23C 5/06 407/33 |
| 2016/0207124 | A1* | 7/2016 | Brown | ................... | B23C 5/207 |
| 2017/0080503 | A1* | 3/2017 | Koike | ....................... | B23C 5/22 |
| 2017/0291232 | A1* | 10/2017 | Yamada | ..................... | B23C 5/06 |

FOREIGN PATENT DOCUMENTS

| | | |
|---|---|---|
| EP | 2617505 A1 | 7/2013 |
| EP | 2764939 A1 | 8/2014 |
| WO | 96/18473 A1 | 6/1996 |
| WO | 01/87523 A1 | 11/2001 |

* cited by examiner

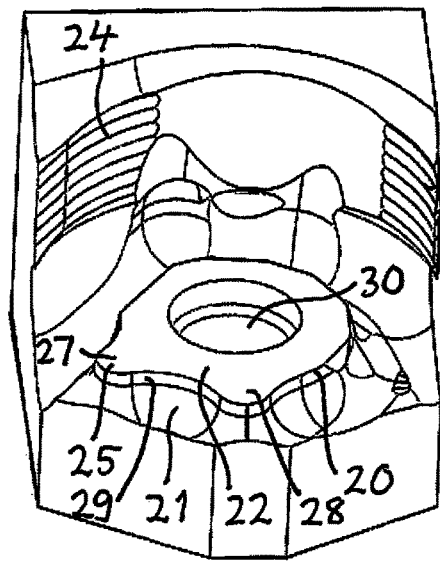
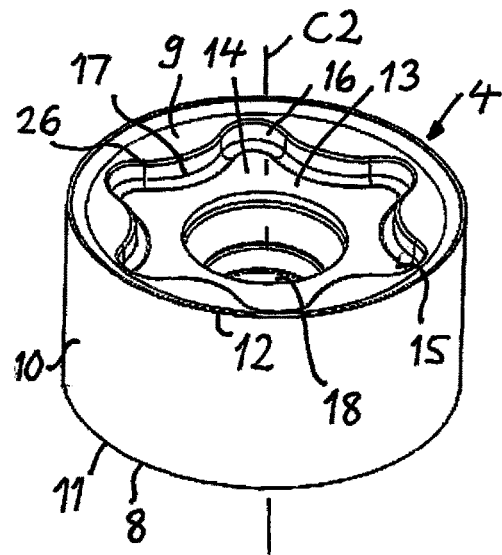
Fig 2
Fig 3
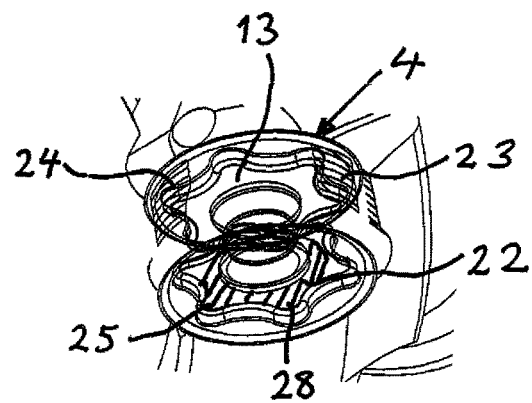
Fig 4

CUTTING TOOL AND A CUTTING INSERT FOR CHIP-REMOVING TOOL

RELATED APPLICATION DATA

This application is a § 371 National Stage Application of PCT International Application No. PCT/EP2015/070131 filed Sep. 3, 2015 claiming priority of EP Application No. 14186207.8, filed Sep. 24, 2014.

TECHNICAL FIELD OF THE INVENTION

The present invention relates to a cutting tool configured for chip-removing machining including a tool body and at least one cutting insert.

The invention is especially directed to cutting tools and indexable cutting inserts to be used in such tools for milling and will for that sake hereinafter mainly be discussed and illustrated for that particular application but is not at all restricted thereto. Said tool and insert may just as well be used for other types of chip-removing machining, such as turning. Examples of conceivable milling procedures are face milling, ramping and interpolation.

Such milling tools have normally a plurality of, for example six, pockets to which a cutting insert is releasably fixed for enabling indexing of the cutting insert for changing the portion of the cutting edge thereof used for chip-removing machining. It is of vital importance for the result of said machining and the lifetime of said cutting insert that the insert received in said pocket or seat of the tool body is properly supported in a fixed position therein. Such support is to be provided by said means providing support to portions of the side surface of the insert and said flat support face providing support to the lower surface of the insert and against which fastening means is pressing the lower surface while securing the insert in a said pocket. It is also important that the insert may not move when a rotational moment is acting thereupon in an active chip-removing state of the tool, and that is ensured by an engagement member of the insert interacting with an engagement member of the pocket.

BACKGROUND ART

EP 2 764 939 A1 discloses a cutting tool and a cutting insert of the type defined in the introduction. The support face of the pocket is in that tool provided by a flat pocket bottom surface onto which the portions of said lower surface of the insert surrounding said central recess are applied for receiving support thereby. An engagement member is arranged on top of that support face so as to be received in said recess and forming a projecting member for obtaining engagement with a specific extended recess portion and prevent rotation of the insert in said active chip-removing state of the tool.

SUMMARY OF THE INVENTION

The object of the present invention is to provide a cutting tool and a cutting insert of the type defined in the introduction being improved in at least some aspect with respect to such cutting tools and cutting inserts already known.

This object is with respect to the cutting tool obtained by providing such a cutting tool with the features listed in the characterizing part of appended claim 1.

By providing said support face through a raised portion proper support may be obtained by using the bottom surface of the recess provided for indexation and for preventing rotation of the insert received in the pocket. This does not only mean that an adequate support may be provided to said insert from below, but also a possibility to use a reversible, i.e. double-sided, insert in said cutting tool, which is not possible in a cutting tool having said support face as in the known cutting tool mentioned above.

According to an embodiment of the invention said at least one projecting member carries said support face to support the insert on said bottom surface within said extended recess portion. This means that said support face will come close to the outer border of a recess receiving said projecting member improving the protection and support of portions of the insert exerted to cutting forces in the active chip-removing state of the tool.

According to another embodiment of the invention said second engagement member comprises a first said projecting member located to support said insert through the support face portion thereon in the region configured to be exerted to load in an active chip-removing state of the tool. In a further development of that embodiment said first projecting member is projecting in a direction, as seen from said centre axis of an insert receiving this member, deviating by 0-45° from a corresponding direction pointing towards a point of said cutting edge exerted to a maximum load in an active chip-removing state of the tool. The insert will by this receive support through said support face where the cutting forces are the highest reducing any risk of cracking of said insert during said cutting operation.

According to another embodiment of the invention said first projecting member, when received in a said extended recess portion, is configured to extend to a distance from said centre axis being at least 70%, 75%-95% or 80%-90% of the distance from said centre axis to said side surface of the insert. The support face will by that provide support to the insert close to the periphery of the insert reducing the risks of cracking of the insert where the risk thereof is normally the highest during said cutting operation.

According to another embodiment of the invention said insert is provided with at least three said extended recess portions, and said second engagement member comprises two said projecting members. The arrangement of two said projecting members improves the stability and support of the insert in said pocket with respect to the presence of one said projecting member. It is then preferred that a second of said two projecting members is configured to project into the extended recess portion following upon the extended recess portion into which said first projecting member is projecting as seen in the direction of a said rotational moment acting on the insert in an active chip-removing state of the tool.

According to another embodiment of the invention each said projecting member is designed to project into a said extended recess portion with a clearance between said delimiting walls of the projecting member and the recess border walls in said extended recess portion of the recess. The clearance may be very small, yet of such size that the insert's recess is easily mounted or placed onto the projecting member of the raised portion. The projecting member and the recess border wall may nevertheless be pressed against each other by the fastening means being arranged to press them together in the secured position of the insert. This furthermore means that said two projecting members may be formed on said raised portion without making the insert seat formed in the pocket over-determined. The second projecting member may hereby be provided with a somewhat larger clearance than the first projecting member to further facilitate the mounting of the insert's recess onto the support face and the projecting members.

According to another embodiment of the invention said recess is provided with a plurality of valley- or finger-like said extended recess portions uniformly distributed around said centre axis of the insert, and the number of said portions may according to another embodiment of the invention be 2-8, 5-8, 6-8 or 6 resulting in a corresponding number of index positions of the insert when using said cutting edge for chip-removing machining.

According to another embodiment of the invention said top surface of the insert is circular and said cutting edge is circular.

According to another embodiment of the invention said insert is reversible in the sense that said lower and top surfaces thereof are identical and a said cutting edge is formed between each of these surfaces and said side surface of the insert, which results in a doubling of the number of possible indexations, which prolongs the service life of the cutting insert and thus provides for better tool economy with respect to for instance a cutting tool according to the document mentioned above.

According to another embodiment of the invention said means providing support to portions of said side surface of the insert comprises at least one support surface comprising at least three ridges with grooves therebetween, the grooves being manufactured by means of a ball nose end mill imparting a concavely arched shape thereto, and the grooves have a depth being 0.015 to 0.025 mm. Such support surfaces and the production thereof are disclosed in EP 1 629 917 B1 and result in a possibility to produce a said support surface in a pocket of a tool body with difficulty of access. Grooves with such a limited depth results in a surface able to provide a good support.

According to another embodiment of the invention the cutting tool is a milling tool with said tool body including a front end and a rear end between which a central rotation axis extends around which the tool is rotatable in a direction of rotation, and said pocket is formed in a transition between the front end and an envelope surface extending between the front end and the rear end of the tool body. The cutting tool according to the present invention is particularly suitable for milling operations, especially face milling and ramping.

According to another embodiment of the invention constituting a further development of the embodiment last mentioned said means configured to provide support to portions of said side surface of the insert comprises two separate support surfaces providing axial and radial support, respectively, to said insert with respect to said central rotation axis of the tool. These two separate support surfaces will together with said support face ensure that a cutting insert will receive accurate support and be held firmly in a said pocket in a milling tool according to the invention. It is then advantageous, as stated in another embodiment of the invention, to have said first projecting member projecting in a direction deviating by 0°-45°, 0°-25° or 0°-5° with respect to the extension of said central rotation axis of the tool. This means that said support face will provide proper support in the region of the insert where the cutting forces are the highest. In other words the support face is extended outwards to provide support to the lower surface of the insert in a region below and along the active cutting edge during milling.

The object of the present invention is with respect to the indexable cutting insert for a chip-removing tool obtained by providing an insert according to the independent claim directed to such an insert. The advantages of such an insert and embodiments thereof appear clearly from the above discussion of a cutting tool according to the invention and the embodiments thereof. One main advantage is the possibility of providing adequate support to said insert via the flat bottom surface of said central recess, making it possible to use a reversible, i.e. double-sided, insert in said cutting tool. Hence, the flat bottom surface of the central recess is configured to form the only portion of the lower surface to be supported by the support face on the raised portion in the pocket. The flat bottom surface of the recess is hereby provided with an adequate surface area for supporting the lower surface of the insert. In other words the lower surface of a double-sided insert including a cutting edge (and rake surface) is not bearing against any of the surrounding pocket portions.

Other advantageous features as well as advantages of the present invention appear from the description following below.

BRIEF DESCRIPTION OF THE DRAWINGS

With reference to the appended drawings, below follows a specific description of an embodiment of the invention cited as an example.

In the drawings:

FIG. 2 shows a perspective view of a pocket of the tool shown in FIG. 1, FIG. 3 shows a perspective view of a cutting insert according to an embodiment of the invention, and FIG. 4 shows in transparency the cutting insert according to FIG. 3 received in a pocket according to FIG. 2.

DETAILED DESCRIPTION OF AN EMBODIMENT OF THE INVENTION

Figure 1:
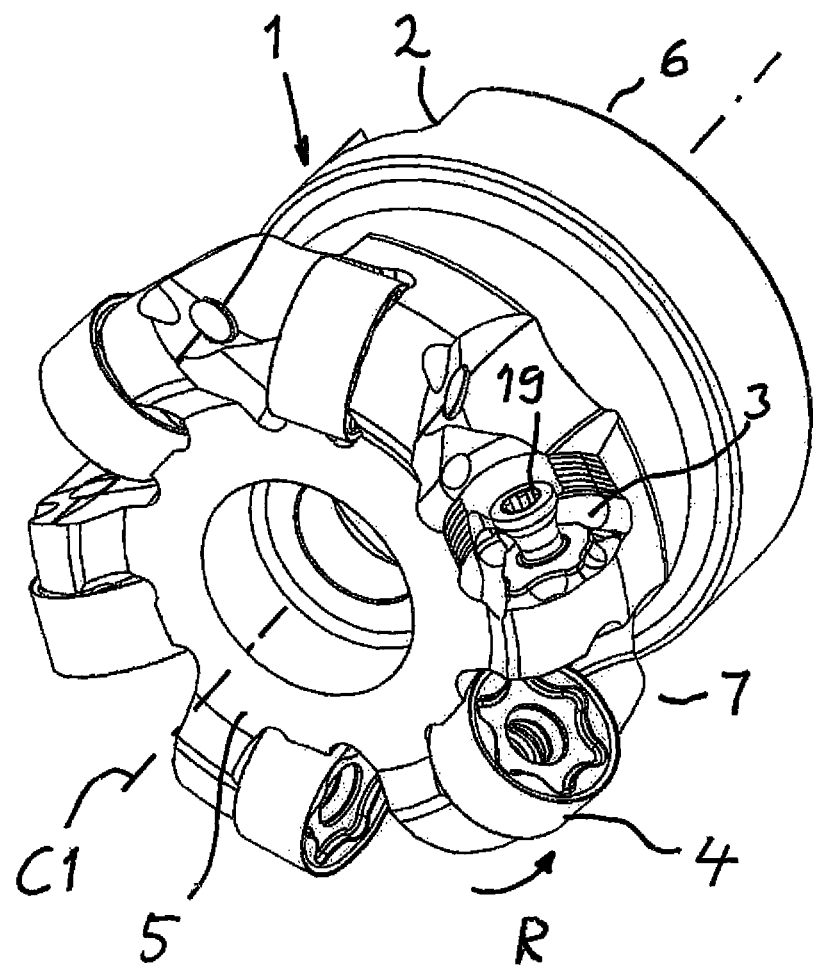
FIG. 1 shows a perspective view of a milling tool according to the present invention.

A face milling tool 1 according to an embodiment of the invention is shown in FIG. 1. The tool comprises a tool body 2 having six seats or pockets 3 each receiving a double-sided cutting insert 4 releasably fixed to the pocket. The cutting insert is removed from one of the pockets in FIG. 1 for illustrating the structure of the pockets. The tool body 2 includes a front end 5 and a rear end 6 between which a central rotation axis C1 extends around which the tool is rotatable in a direction of rotation R. The pockets 3 are formed in a transition between the front end and an envelope surface 7 extending between the front end and the rear end of the tool body. The double-sided inserts 4 are of the negative type, which are fixed in the pockets and tilted with an axial angle of −7° to −12° and a radial angle of −8° to −15° with respect to the central rotation axis C1 in order to provide clearance between the cutting inserts and workpiece. Other axial and radial angles are of course conceivable.

The construction of the milling tool shown in FIG. 1 and the cutting inserts thereof will now be explained by making reference to FIG. 1-4. FIG. 3 shows a cutting insert 4 according to an embodiment of the invention. The cutting insert is double-sided or reversible, which means that the top and bottom thereof have the same design, but the side shown with the orientation of the insert in the figure as the upper side will hereinafter be called the top, although it may just as well be the bottom or lower side of the insert. Accordingly, the insert has as seen in the figures a hidden lower surface 8, a top surface 9 and a surrounding side surface 10 connecting the lower surface and the top surface. The lower surface and the top surface are circular and have each a circular cutting edge 11, 12 formed between these surfaces and the side surface 10. The top surface 9 and the lower surface 8 are provided with a central recess 13 with a flat bottom surface 14. The recess 13 has six extended portions 15 of a valley- or finger-like design uniformly distributed around a centre axis C2 of the insert. These extended portions 15 are defined by border walls 16 of the recess and extend further radially with respect to said centre axis C2 than adjacent portions 17 of the recess. The insert is provided with a central axial through-hole 18 for securing it in a pocket 3 of the tool by a screw 19. Each pocket 3 has a portion 20 raised with respect to surrounding pocket portions 21 and provided with a flat support face 22 as upper surface. The raised portion 20 is configured to be received in the central recess 13 of the insert fixed in the pocket and provide support through the support face 22 to the bottom surface 14 of the recess.

The pocket has also means configured to provide support to portions of the side surface 10 of an insert received in the pocket in the form of two separate support surfaces, one 23 for providing axial support and one 24 for providing radial support. These two support surfaces are formed by ridges with grooves therebetween, in which the grooves are manufactured by means of a ball nose end mill imparting a concavely arched shape thereto with the grooves having a depth being 0.015 to 0.025 mm.

The raised portion 20 of the pocket has a first projecting member 25 configured to project into and be received in one extended recess portion 15 of the insert and engage portions 26 of recess border walls to establish mutual engagement of the insert and pocket to prevent rotation of the insert about the centre axis C2 of the insert by receiving a rotational moment acting on the insert in an active chip-removing state of the tool. The projecting member 25 carries said support face 22 to support the insert on the bottom surface 14 within a said extended recess portion 15. The first projecting member 25 is here directed at "six o'clock" with respect to the central rotation axis C1 of the tool which means in the direction of that axis, which means that it will provide support by the support face portion 27 thereon in the region of the insert configured to be exerted to a maximum load in an active chip-removing state of the tool and by that efficiently counteract any cracking or breaking tendency of the insert. The extended recess portions 15 are designed to allow said first projecting member to be designed to extend to a distance from said centre axis C2 of an insert received in the pocket being in the order of 90% of the distance from said centre axis to the side surface of the insert. The raised portion 20 is provided with two said projecting members and a second said projecting member 28 is configured to project into the extended recess portion 15 following upon the extended recess portion into which the first projecting member 25 is projecting as seen in the direction of a said rotational moment. The two projecting members are designed to project into a said extended recess portion with a clearance between delimiting walls 29 of the projecting member and the recess border walls 26 in the respective extended recess portion of the insert for simplifying mounting of the insert and avoiding that the seat of the pocket will be over-determined.

The raised portion 20 of the pocket has a threaded bore 30 for receiving a screw 19 configured to secure the insert in the pocket. The bore 30 is located slightly offset with respect to the through-hole 18 of the insert, which means that the screw 19 will urge portions of the side surface 10 of the insert to bear under pretension against the support surfaces 23 and 24 of the pocket when the screw is tightened and then also press the bottom surface 14 of the central recess 13 of the insert against the support face 22 of the pocket. When the operation of the tool is started a rotational moment about the central rotation axis C2 will be applied to each insert trying to rotate the insert and ensuring stable and reproducible positioning of the insert in the pocket by bringing delimiting walls 29 of the first projecting member 25 into engagement with portions 26 of the recess border wall of the insert preventing further rotation of the insert.

The insert may be indexed six times for having said first projecting member 25 received in each of the extended recess portions 15 and then reversed enabling 12 indexations of the insert.

The invention is of course not restricted to the embodiment thereof described above, but many possibilities to modifications thereof would be apparent to a person with skill in the art without departing from the scope of the invention as defined in the appended claims.

The number of indexations provided by each central recess of the insert may be another than six. The insert may have a polygonal cross-section with a plurality of distinctive straight cutting edges along the upper and lower border thereof. The fastening means for securing the insert in the pocket may for instance be a clamp instead of a screw and the insert does then not need to have a central through-hole neither does the raised portion of the pocket then have to have a bore. The insert may be single-sided. Although the extended recess portions of the lower and the top surface are aligned with each other in the embodiment shown in the figures they may be displaced with respect to each other by any desired angle. These are only a few of possible modification within said scope of the invention.

The invention claimed is:

1. A cutting tool, comprising:
    a tool body having at least one pocket;
    at least one cutting insert releasably fixed to said pocket, said insert having a lower surface, a top surface, a surrounding side surface connecting the lower surface and the top surface and at least one cutting edge formed between the top surface and the side surface, said pocket having at least one support surface configured to provide support to portions of said side surface and a flat support face configured to provide support to at least one portion of said lower surface of said insert; and
    a fastening device configured to secure said insert in said at least one pocket while pressing said at least one portion of said lower surface against said support face, said insert having a first engagement member, said at least one pocket including a second engagement member configured to establish mutual engagement of the insert and pocket to prevent rotation of the insert about an insert centre axis extending through said top surface and lower surface of the insert by receiving a rotational moment acting on the insert in an active chip-removing state of the tool, said lower surface of the insert having a central recess with a flat bottom surface, said first engagement member including at least two extended portions of said central recess defined by border walls of said recess and extending further radially from the centre axis than adjacent portions of said central recess, and said second engagement member including at least one fixed projecting member of the pocket configured to project into and be received alternatively in one of said extended recess portions and engage portions of said recess border walls to establish said mutual engagement and enabling indexing of said insert, wherein said pocket of the tool body has a raised portion raised with respect to surrounding pocket portions and having said support face as an upper surface, said raised portion being arranged to be received in said central recess of the insert and supporting the insert by receiving said bottom surface of the central recess bearing on said support face, said at least one projecting member of the second engagement member being formed by said raised portion and having delimiting walls arranged to bear against said recess border walls of said recess portion so as to establish said mutual engagement to prevent rotation.

2. The cutting tool according to claim 1, wherein said at least one projecting member carries said support face to support the insert on said bottom surface within a said extended recess portion.

3. The cutting tool according to claim 2, wherein said second engagement member includes a first said projecting member arranged to support said insert through the support face portion thereon in a region located below an active cutting edge, which is exerted to load in the active chip-removing state of the tool.

4. The cutting tool according to claim 3, wherein said first projecting member projects in a direction, as seen from said centre axis of an insert receiving this member, deviating by 0-45° from a corresponding direction pointing towards a point of said cutting edge exerted to a maximum load in the active chip-removing state of the tool.

5. The cutting tool according to claim 3, wherein said first projecting member, when received in said extended recess portion, is configured to extend to a distance from said centre axis being at least 70%, 75%-95% or 80%-90% of the distance from said centre axis to said side surface of the insert.

6. The cutting tool according to claim 1, wherein said insert is provided with at least three said extended recess portions, said second engagement member including two said projecting members.

7. The cutting tool according to claim 6, wherein a second of said two projecting members is configured to project into the extended recess portion following upon the extended recess portion into which said first projecting member projects as seen in the direction of a rotational moment acting on the insert in an active chip-removing state of the tool.

8. The cutting tool according to claim 1, wherein each said projecting member is designed to project into said extended recess portion with a clearance between said delimiting walls of the projecting member and the recess border walls in said extended recess portion of the insert.

9. The cutting tool according to claim 1, wherein said central recess is provided with a plurality of valley- or finger-like extended recess portions uniformly distributed around said centre axis of the insert.

10. The cutting tool according to claim 9, wherein said insert has 2-8, 5-8, 6-8 or 6 said extended recess portions in said central recess.

11. The cutting tool according to claim 1, wherein said top surface of the insert is circular and said cutting edge is circular.

12. The cutting tool according to claim 1, wherein said insert is reversible such that said lower and top surfaces thereof are identical and a said cutting edge is formed between each of these surfaces and said side surface of the insert.

13. The cutting tool according to claim 1, wherein said at least one support surface providing support to portions of said side surface of the insert includes at least three ridges with grooves therebetween, the grooves having a concavely arched shape and a depth of 0.015 to 0.025 mm.

14. The cutting tool according to claim 1, comprising a milling tool with said tool body including a front end and a rear end between which a central rotation axis extends around which the tool is rotatable in a direction of rotation, said pocket being formed in a transition between the front end and an envelope surface extending between the front end and the rear end of the tool body.

15. The cutting tool according to claim 14, wherein said at least one support surface is configured to provide support to portions of said side surface of the insert and includes two separate support surfaces providing axial and radial support, respectively, to said insert with respect to said central rotation axis of the tool.

16. The cutting tool according to claim 3, wherein said first projecting member projects in a direction deviating by 0°-45°, 0°-25° or 0°-5° with respect to the extension of said central rotation axis of the tool.

17. An indexable cutting insert for a chip-removing tool comprising:
a lower surface configured to be supported by a flat support face of a pocket of a tool body of said tool;
a top surface;
a surrounding side surface connecting the lower surface and the top surface;
at least one cutting edge formed between the top surface and the side surface, wherein the insert is reversible such that said lower and top surfaces thereof are identical and the at least one cutting edge is formed between each of these surfaces and said side surface of the insert; and
a central recess in said lower surface, the central recess having a flat bottom surface and at least two extended recess portions defined by border walls of said central recess, the at least two extended recess portions extending further radially from a centre axis of the insert extending through said top surface and lower surface than adjacent portions of said central recess and configured to receive at least one member of said pocket for defining a fixed position of the insert when fixed to said pocket, wherein said flat bottom surface of said central recess is configured to form the only portion of said lower surface supported by said support face forming an upper surface of a portion being raised with respect to surrounding pocket portions.

18. The cutting insert according to claim 17, wherein said central recess is provided with a plurality of valley- or finger-like extended recess portions uniformly distributed around said centre axis of the insert.

19. The cutting insert according to claim 17, wherein said top surface of the insert is circular and said cutting edge is circular.

20. The cutting insert according to claim 17, wherein the extended recess portions of the lower surface are aligned with the extended recess portions of the top surface.

* * * * *